(12) United States Patent
Bullock et al.

(10) Patent No.: US 6,567,474 B1
(45) Date of Patent: May 20, 2003

(54) DIGITAL WIRELESS PHONE/MODEM JACK CAPABLE OF COMMUNICATIONS OVER THE POWER LINES USING DIFFERENTIAL BINARY PHASE SHIFT KEYING (DBPSK)

(75) Inventors: Scott R. Bullock, South Jordan, UT (US); Scott D. Smith, Murray, UT (US); David B. Bartholomew, West Valley, UT (US)

(73) Assignee: Phonex Corporation, Midvale, UT (US)

( * ) Notice: Subject to any disclaimer, the term of this patent is extended or adjusted under 35 U.S.C. 154(b) by 0 days.

(21) Appl. No.: 09/260,868

(22) Filed: Mar. 2, 1999

(51) Int. Cl.[7] .............................................. H04L 27/18
(52) U.S. Cl. ....................... 375/279; 375/271; 375/273; 375/283; 375/329; 375/330; 340/310.01; 340/310.02
(58) Field of Search ................................. 375/271, 223, 375/279, 273, 283, 308, 329, 330, 331, 332, 295; 455/23; 332/103; 340/310.01, 310.02; 329/304

(56) References Cited

U.S. PATENT DOCUMENTS

| | | | |
|---|---|---|---|
| 4,562,415 A | 12/1985 | McBiles ..................... 332/9 R |
| 4,829,543 A | 5/1989 | Borth et al. ................... 375/83 |
| 5,025,452 A | 6/1991 | Sohner et al. ................. 375/1 |
| 5,068,890 A | 11/1991 | Nilssen ......................... 379/90 |
| 5,319,634 A | 6/1994 | Bartholomew et al. ........ 370/18 |
| 5,353,301 A | 10/1994 | Mitzlaff ......................... 375/1 |
| 5,422,913 A | 6/1995 | Wilkinson .................... 375/347 |
| 5,488,629 A | 1/1996 | Takahashi et al. .......... 375/206 |
| 5,499,272 A | 3/1996 | Bottomley ................... 375/347 |
| 5,504,777 A | 4/1996 | Hawkins et al. ............. 375/222 |
| 5,528,585 A | 6/1996 | Cooley et al. ................ 370/56 |
| 5,546,383 A | 8/1996 | Cooley et al. ................ 370/50 |
| 5,546,422 A | 8/1996 | Yokev et al. ................. 375/202 |
| 5,579,304 A | 11/1996 | Sugimoto et al. ............. 370/18 |
| 5,592,506 A | 1/1997 | Omura et al. ................ 375/207 |
| 5,610,939 A | 3/1997 | Takahashi et al. .......... 375/206 |
| 5,640,333 A | 6/1997 | Hawkins et al. ........... 364/514 C |
| 5,661,802 A | 8/1997 | Nilssen ......................... 380/20 |
| 5,689,527 A | 11/1997 | Hawkins et al. ............. 375/222 |
| 5,706,313 A | 1/1998 | Blasiak et al. ............... 375/330 |
| 5,706,428 A | 1/1998 | Boer et al. ................... 395/200 |
| 5,712,872 A | 1/1998 | Hawkins et al. ............. 375/222 |
| 5,729,571 A | 3/1998 | Park et al. ................... 375/206 |
| 5,745,480 A | 4/1998 | Behtash et al. .............. 370/252 |
| 5,784,402 A | 7/1998 | Feher ........................... 375/200 |
| 5,802,467 A | 9/1998 | Salazar et al. ............... 455/420 |
| 5,805,017 A | 9/1998 | Razzell ........................ 329/300 |
| 5,818,127 A | 10/1998 | Abraham ..................... 307/106 |
| 5,822,363 A | * 10/1998 | Le Roy ........................ 375/143 |
| 5,825,810 A | 10/1998 | Omura et al. ................ 375/200 |
| 5,828,692 A | 10/1998 | Walley ......................... 375/200 |
| 5,828,707 A | 10/1998 | Urabe et al. ................. 375/330 |
| 5,841,390 A | * 11/1998 | Tsui ............................. 341/173 |
| 5,848,103 A | * 12/1998 | Weerackody ................ 375/295 |
| 6,118,827 A | * 9/2000 | Wynn .......................... 375/273 |
| 6,320,941 B1 | * 11/2001 | Tyroler ....................... 379/93.24 |

* cited by examiner

Primary Examiner—Shuwang Liu
(74) Attorney, Agent, or Firm—Lloyd W. Sadler

(57) ABSTRACT

A system for communicating signals between a transmitter and a receiver using digital modulation techniques is provided. This invention is particularly adapted to meet the requirements of power line communication. In one preferred embodiment of this invention the modulation technique is differential binary phase shift key modulation. This system provides a low cost, simple delay and multiply process for the modulation and demodulation of data. This system lends itself to an ASIC implementation, thereby further reducing the cost of the system while improving the reliability of the system in a noisy environment.

1 Claim, 4 Drawing Sheets

DIGITAL WIRELESS PHONE/MODEM JACK CAPABLE OF COMMUNICATIONS OVER THE POWER LINES USING DIFFERENTIAL BINARY PHASE SHIFT KEYING (DBPSK)

BACKGROUND OF THE INVENTION

1. Field of the Invention

This invention relates to methods and systems for the communication of telephone and modem signals over AC power lines. More specifically, the invention relates to the use of the digital techniques of differential binary phase shift keying modulation techniques in AC power line communications.

2. Description of Related Art

A variety of telephone and modem communications systems which take advantage of the AC power line for communications within a building or facility are well known in the art. Generally, these prior systems use analog frequency modulation techniques and fail to take advantage of digital processing and modulation techniques.

The reader is referred to the following U.S. patent documents for general background material. Each of these patents is hereby incorporated by reference in its entirety for the material contained therein.

U.S. Pat. No. 4,562,415 describes an apparatus and method, which provides PSK modulation utilizing a single balance mixer.

U.S. Pat. No. 4,829,543 describes a method and apparatus for phase-coherently demodulating a multipath-impaired time division multiple access QPSK data timeslot.

U.S. Pat. No. 5,025,452 describes a spread spectrum communications system that provides full-duplex voice/data radio communications with a single specified FCC ISM band.

U.S. Pat. No. 5,068,890 describes a combined telephone and electric power distribution system, wherein the signal conducting means and electric power conducting means are routed along-side each other to/from various utilization points.

U.S. Pat. No. 5,319,634 describes a method and system for conducting multiple access simultaneous telephone communications in full duplex either over the power lines of a building or using RF transmission.

U.S. Pat. No. 5,353,301 describes a method and apparatus for combining. multipath spread-spectrum signals, that is accomplished by detecting an envelope of an input differential phase shift keyed signal communicated over a communication channel.

U.S. Pat. No. 5,422,913 describes a high frequency transmitter that comprises a large number of narrow band channels spaced over a broad bandwidth transmission, using differential phase shift key modulations.

U.S. Pat. No. 5,488,629 describes a signal processing circuit that is provided with a frequency conversion circuit for converting a spread quadrature modulation signal of a carrier band into a baseband signal, a first correlator, a second correlator, a third correlator, a forth correlator spreading code, a decoding circuit, a first and second multiplier, a first and second adder, a judgment circuit, and a subtractor.

U.S. Pat. No. 5,499,272 describes a digital communications receiver that provides joint MLSE equalization and diversity combining.

U.S. Pat. No. 5,504,777 describes a communications system programmable to operate at a selected one of multiple frequency ranges and any one of a plurality of modulation schemes and data rights including an open architectural bus line for linking a plurality of board level units.

U.S. Pat. Nos. 5,528,585 and 5,546,383 describe a power-conserving time division multiple access (TDMA) radio telephone system, in which a cluster of subscriber stations, remote from a base station, employ a common pool of frequency-agile modems, each of which digitally synthesizes, on a timeslot-by-timeslot basis, the different channel-identifying intermediate frequencies needed to support communications between several of the subscriber stations and the base station.

U.S. Pat. No. 5,546,422 describes an acknowledgement paging system, which fits within the existing infrastructure of a paging network and which provides low cost manufacture and low power operation while still enabling the acknowledgement paging over long distances.

U.S. Pat. No. 5,579,304 describes a code-division multiple-access receiver that carries out the following steps whenever it recognizes a symbol boundary in the received baseband signal: first it estimates the value of the symbol; next it estimates an interference signal and modifies the baseband signal. These steps are iterated for each symbol.

U.S. Pat. No. 5,592,506 describes a method for demodulating a received spread-spectrum signal using a minimum-shift-keyed (MSK) receiver.

U.S. Pat. No. 5,610,939 describes a digital correlator used in a receiving component of a spread spectrum communication system of a direct sequence modulation type.

U.S. Pat. No. 5,640,333 describes a communications system that is programmable to operate at a selected one of multiple frequency ranges and any one of a plurality of modulation schemes and data rights including an open architectural bus line for linking a plurality of board level units.

U.S. Pat. No. 5,661,802 describes a telephone auxiliary power distribution system in a building has a flexible multi-conductor signal and power distribution cable; which cable originates from a central signal and power management facility located near the point where the telephone utility line enters the building and extends from there to each of numerous locations within the building.

U.S. Pat. No. 5,689,527 describes a communications system programmable to operate at a selected one of multiple frequency ranges and any one of a plurality of modulations schemes and data rights including an open architectural bus line for linking a plurality of board level units.

U.S. Pat. No. 5,706,313 describes a decoding apparatus that decodes a coherent, differentially encoded multi-level phase shift keying (DEPSK) modulated signal.

U.S. Pat. No. 5,706,428 describes a wireless LAN includes first stations adapted to operate at a 1 or 2 Mbps data rate and second stations adapted to operate at 1, 2, 5 or 8 Mbps data rate.

U.S. Pat. No. 5,712,872 describes a communications system that is programmable to operate at a selected one of multiple frequency ranges and any one of a plurality of modulations schemes and data rights, that includes an open architectural bus line for linking a plurality of board level units.

U.S. Pat. No. 5,729,571 describes a non-coherent digital receiver of a spread spectrum communication system for baseband synchronizing of a reference pseudo-noise sequence with a received pseudo-noise sequence modulated in a received spread spectrum signal.

U.S. Pat. No. 5,745,480 describes a multi-rate wireless communications system that supports a plurality of distributed user terminals in full-duplex simultaneous communications with a central base station, where each user terminal is provided on demand with one of multiple bit rates at a negotiated QOS.

U.S. Pat. No. 5,784,402 describes transmitter-receiver systems and circuits which employ binary and quadrature Feher's modulation.

U.S. Pat. No. 5,802,467 describes an interactive microprocessor based wireless communication device that includes sound and data transceivers.

U.S. Pat. No. 5,805,017 describes a method of, and receiver for, receiving and demodulating M-ary FSK symbols, where M equals two or four, comprising over sampling a received signal to obtain sub-symbols which are treated as repeated DBPSK π/4 DQPSK symbols, respectively.

U.S. Pat. No. 5,818,127 describes an apparatus for electrical line communications using FM video modulation, and which includes FM video modulation circuits and an impedance matching coupler at each of two or more locations along a pair of line.

U.S. Pat. No. 5,825,810 describes a method for demodulating a received spread-spectrum signal that uses a minimum-shift-keyed (MSK) receiver.

U.S. Pat. No. 5,828,692 describes a cordless telephone system connectable to the public switched telephone network having a base station and one or more handsets communicating with the base station by an RF link utilizing a DBPSK I and Q demodulator with a digital AGC loop.

U.S. Pat. No. 5,828,707 describes a differential detecting apparatus that includes samplers, a differential detection calculating units, and two post-detection filters.

SUMMARY OF THE INVENTION

It is desirable to provide a system for communicating analog audio (voice) and/or digital data signals over the AC power lines. It is particularly desirable to provide such a system, and which makes use of differential binary phase shift keying (DBPSK) digital modulation techniques.

Accordingly, it is the primary object of this invention to provide a system for the communicating analog audio (voice) and/or digital data signals over the AC power lines, using a differential binary phase shift keying modulation technique.

Another object of this invention is to provide a system for the communication of analog audio (voice) and/or digital data signals that includes a DBPSK modulator and a DBPSK demodulator.

A further object of this invention is to provide a system for the communication of analog audio (voice) and/or digital data signals that lends itself to implementation in an ASIC because of its simplicity and digital modulation/demodulation techniques.

Another object of this invention is to provide a system for the communication of analog audio (voice) and/or digital data signals that minimizes the cost and complexity required of the modulation system.

Additional objects, advantages, and other novel features of this invention will be set forth in part in the description that follows and in part will become apparent to those skilled in the art upon examination of the following or may be learned with the practice of the invention. The objects and advantages of this invention may be realized and attained by means of the instrumentalities and combinations particularly pointed out in the appended claims. Still other objects of the present invention will become readily apparent to those skilled in the art from the following description wherein there is shown and described the preferred embodiment of this invention, simply by way of illustration of one of the modes best suited to carry out this invention. As it will be realized, this invention is capable of other different embodiments, and its several details, and specific electronic circuits, are capable of modification in various aspects without departing from the invention. Accordingly, the drawings and descriptions should be regarded as illustrative in nature and not as restrictive.

To achieve the foregoing and other objectives, and in accordance with the purposes of the present invention, the DBPSK modulator is provided with a digitizer, a summer, a differential encoder, phase shifter and a transmitter. While the DBPSK demodulator is provided with receiver, a delay circuit, and a mixer.

BRIEF DESCRIPTION OF THE DRAWINGS

The accompanying drawings incorporated in and forming a part of the specification, illustrate a preferred embodiment of the present invention. Some, although not all, alternative embodiments aredescribed in the following description. In the drawings.

Reference will not be made in detail to the present preferred embodiment of the invention, an example of which is illustrated in the accompanying drawings.

DETAILED DESCRIPTION OF THE INVENTION

Figure 1:
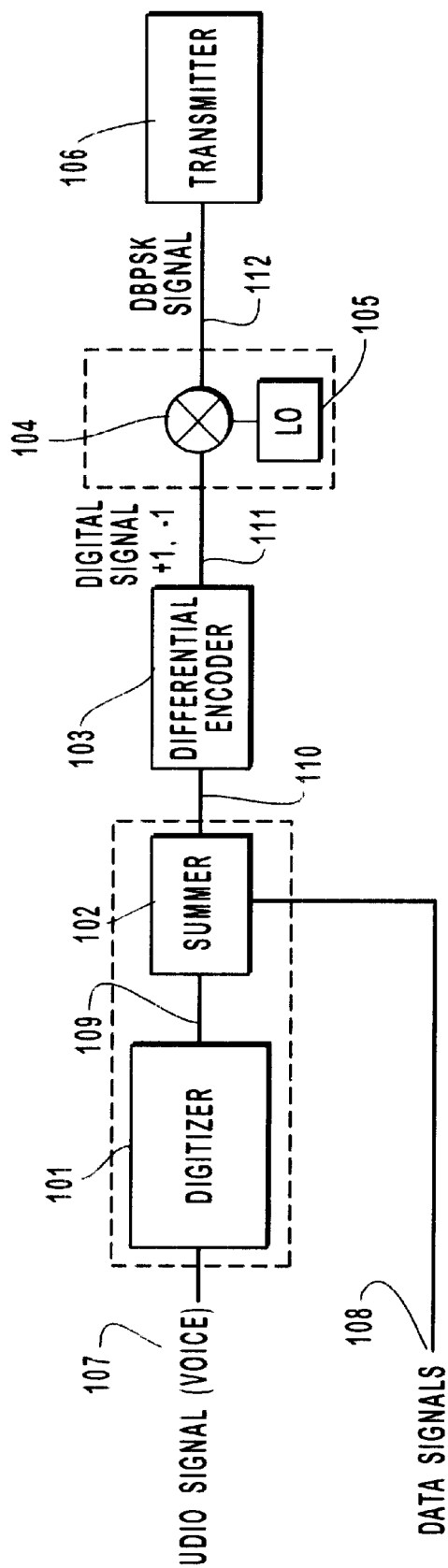
FIG. 1 is a top level system block diagram showing the major sections of the preferred modulator of this invention.

FIG. 1 shows the top level system block diagram of the preferred embodiment of the modulator of the invention. A digitizer 101 receives the analog audio or voice signal 107 and converts this analog signal to a digital signal. The resulting digital signal is summed with the digital data signals 108 using a summer 102, forming a composite digital signal. This composite digital signal 110 is received by a differential encoder 103 for changing the data from actual data bits into change of data bits. For example, a change in a data bit value is represented by a "1" and no change in data bit value is represented by a "0". The output 111 of the differential encoder is provided to a 0, 180 degree phase shifter (mixer) 104, which uses the output data 111 to phase shift the carrier signal produced by the local oscillator 105. In this manner a change in phase of the carrier represents a "1" and a change in data bit value, and no change in the phase of the carrier represents a "0" and no change in a data bit value. The output 112 of the phase shifter 104 is a Differential Binary Phase Shift Keyed (DBPSK) signal. This signal is provided to a transmitter 106 for communication to the receiver, whether the base unit or the extension unit.

Figure 2:
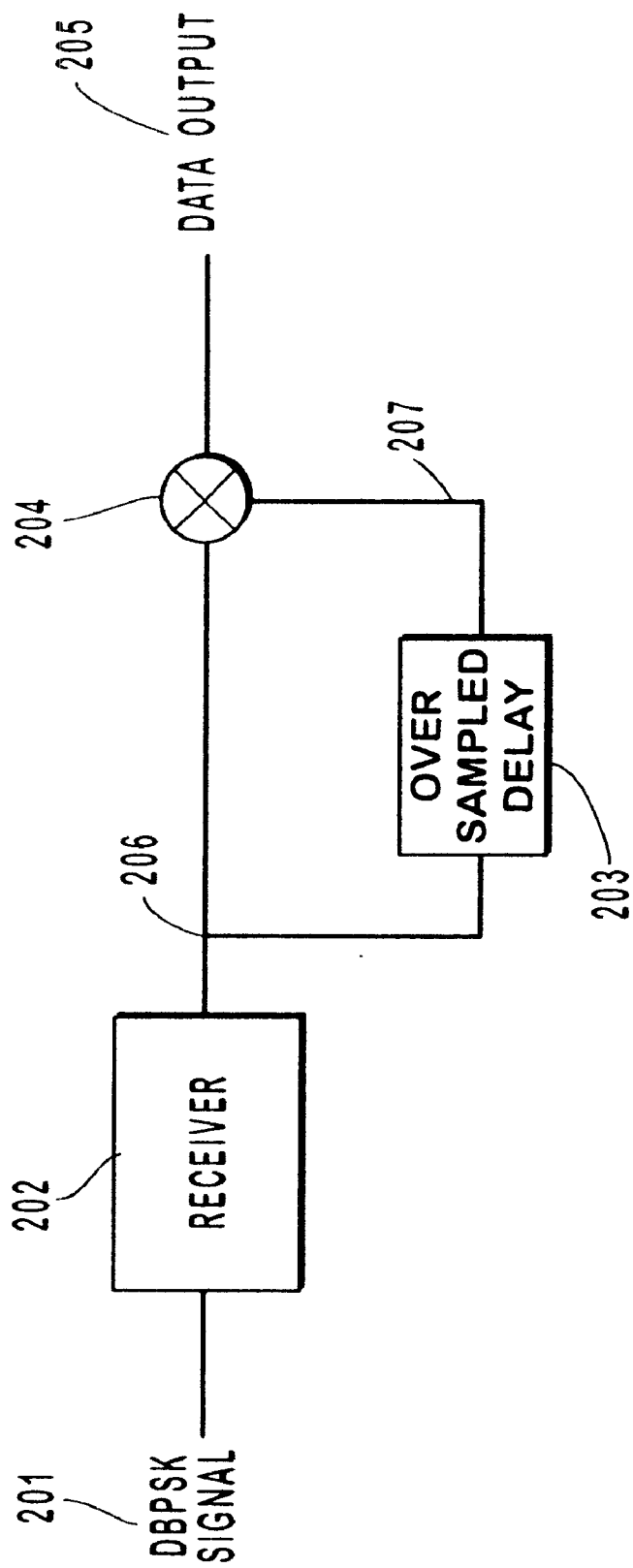
FIG. 2 is a top level block diagram showing the major sections of the preferred demodulator of this invention.

FIG. 2 shows a top level system block diagram of the major sections of the preferred demodulator embodiment of the invention. The DBPSK signal 201 transmitted by the transmitter 106 is received by the receiver 202 for demodulation and removal of the carrier signal. The output 206 receiver 202 is received by two devices: a delay unit 203 and a mixer (or multiplier) 204. The delay unit 203 provides a signal 207 delayed by 1 bit time. The mixer 204 multiplies the signal 206 received from the receiver by the signal 207 delayed by 1 bit time. In this manner the mixer 204 retrieves the data from the transmitted DBPSK signal 201. The output data 205 is a positive 1 if there is no change in the signal bit when comparing the delayed version of the data 207 with the non-delayed version of the data 206, for example, a non-delayed 1 multiplied by a delayed 1 gives a 1 (high) output 205; and a non-delayed −1 multiplied by a non-delayed −1 gives a 1 (high) output 205. While the output 205 is a negative 1 if there was a change in the bit, for example: a non-delayed 1 multiplied by a delayed −1 gives a −1 (low) output 205; and a non-delayed −1 multiplied by a delayed 1 gives a −1 (low) output 205. Therefore, this demodulator detects a change for one bit to the next. The preferred system uses a carrier frequency having a minimum of four carrier cycles per data bit. However, the actual number of cycles is determined from the data rate period and the carrier frequency. For example, with a 3 MHz carrier signal and a 200 kHz data rate, there are approximately 16 carrier cycles per data bit.

Figure 3:
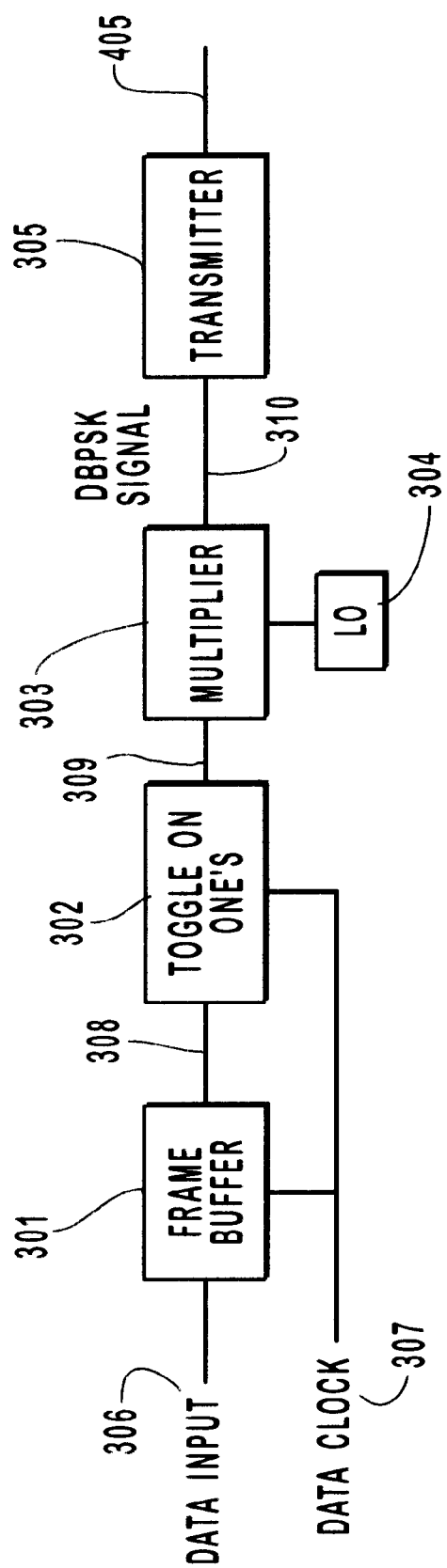
FIG. 3 is the preferred design of the DBPSK modulator of this invention.

FIG. 3 shows the preferred implementation of the DBPSK modulator of this invention. A frame buffer 301 receives, conditions and stores the incoming data 306 until the data clock 307 clocks the data 308 to the toggle block 302. The toggle block 302 toggles the data, alternating between a "one" and a "zero" on every data clock 307 if the data input 308 from the frame buffer 301 is a "one". If the data input 308 from the frame buffer 301 is a "zero", then the toggle state remains the same, that is, the toggle block 302 does not toggle the data. Therefore, if the data is a "one", then there is a change in the data level, and if the data input is a "zero", then this represents no change in the data level. The digital output 309 of the toggle block 302 is input to a multiplier 303 which multiplies the incoming signal 309 with the frequency output of a local oscillator (LO) 304. In this manner, the data is placed on a carrier frequency, which provides a 0, 180 degree phase shift of the carrier. The output 310 of the multiplier 303 is the DBPSK signal and is input to a transmitter 305 for transmission over the AC power line 405. In alternative applications of this modulator, the communication can be other than an AC power line, such as a broadcast RF signal.

Figure 4:
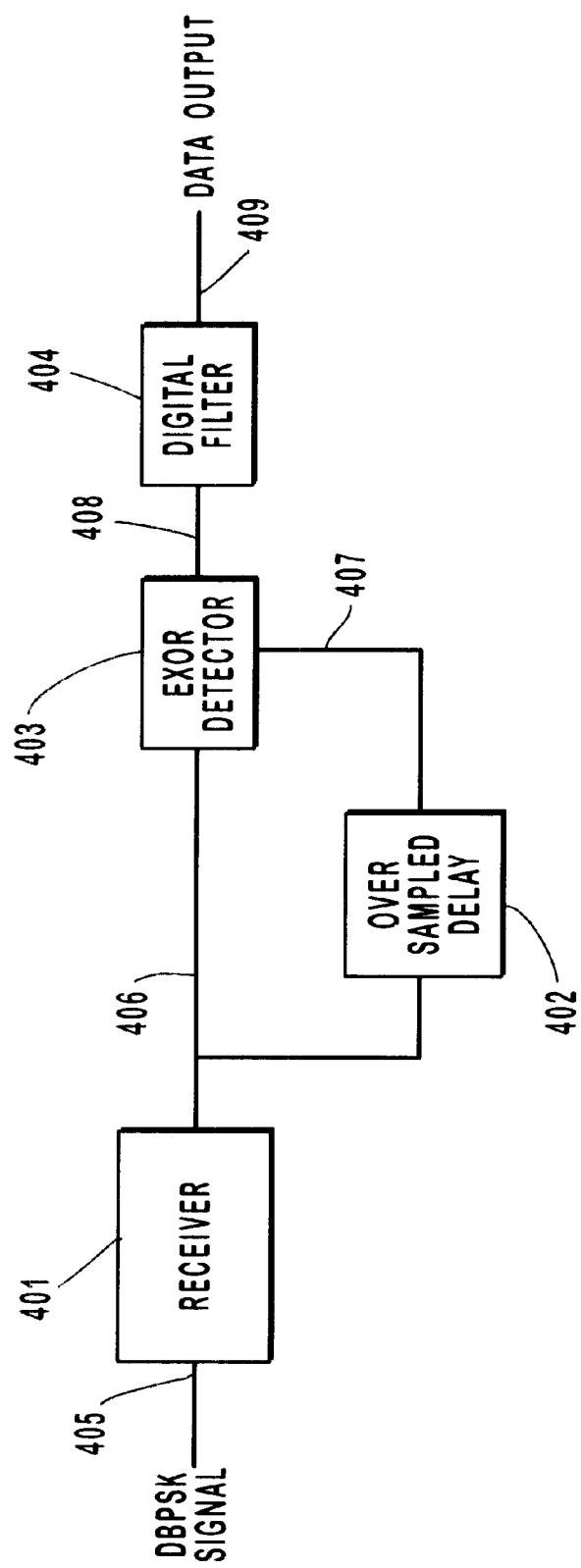
FIG. 4 is the preferred DPBSK demodulator design of this invention.

FIG. 4 shows the design of the preferred DBPSK demodulator. The incoming DBPSK signal 405 is received by the receiver 401 that strips off the carrier frequency and provides a digital bit stream signal 406 to the over sampled delay unit 402 and the EXOR detector 403. The over sampled delay unit 402 delays the received bit stream 406 by one data bit time and provides a delayed output 407 to the EXOR detector 403. The EXOR detector, multiplies the delayed 407 and the non-delayed 406 version of the data, thereby providing the means for detecting the data. A change in data states between the delayed 407 data and the non-delayed 406 data indicates a "one" and no change in data states represents a "zero". The EXOR detector 403 output 408 is provided to a digital filter 404 to smooth out the data improved reception. The smoothed data is provided on the data output 409 of the digital filter 404 for use by the receiving communications device.

The preferred system of this invention provides data security by permitting the selection of different codes and different frequencies. Preferably, an 8-pole tertiary dip switch is used to select the frequency and the codes. The first two switches of the dip switch select among nine different frequencies ($3^2$) and the next three switches of the dip switch select among 27 house codes ($3^2$) The last three switches select among the 27 extension codes ($3^3$). This combination of codes and frequency selection provides a high level of data security and a relatively low probability of signal interference from co-users of the AC power line.

This preferred embodiment of the invention uses DBPSK as the modulation scheme. Other similar but alternative differential modulation schemes can be used without departing from the core concept of this invention. For example, a D8PSK system that has eight phase states instead of two, could be used. This would provide two more bits of information for every data bit sent more than sent using the DBPSK method. In the current best mode of the invention DBPSK is used for simplicity, although such alternatives as D8PSK are contemplated.

The foregoing description is of a preferred embodiment of the invention and has been presented for the purposes of illustration and as a description of the best mode of the invention currently known to the inventors. It is not intended to be exhaustive or to limit the invention to the precise form, connections, or choice of components disclosed. Obvious modifications or variations are possible and foreseeable in light of the above teachings. This embodiment of the invention was chosen and described to provide the best illustration of the principles of the invention and its practical application to thereby enable on of ordinary skill in the art to utilize the invention in various embodiments and with various modifications as are suited to the particular use contemplated. All such modifications and variations are within the scope of the invention as determined by the appended claims when they are interpreted in accordance with the breadth to which they are fairly, legally and equitably entitled.

We claim:

1. A communication system for communicating signals and data, comprising:

(A) a differential modulator receiving an analog signal and producing a modulated signal, wherein said differential modulator further comprises:

(1) a frame buffer receiving said analog signal and producing a clocked data stream;

(2) a toggle block receiving said clocked data stream and producing an alternating signal based on said clocked data stream; and (3) a multiplier receiving said alternating signal and producing said modulated signal;

(B) a transmitter receiving said modulated signal and transmitting a transmitted signal over a communication channel;

(C) a receiver receiving said transmitted signal over said communication channel and producing an output signal; and (D) a demodulator receiving said output signal and producing a data output signal for use by a communication device.

* * * * *